Oct. 25, 1938.   J. J. McLAUGHLIN   2,134,619
NUT THREADING MACHINE
Original Filed Jan. 10, 1936    7 Sheets-Sheet 7
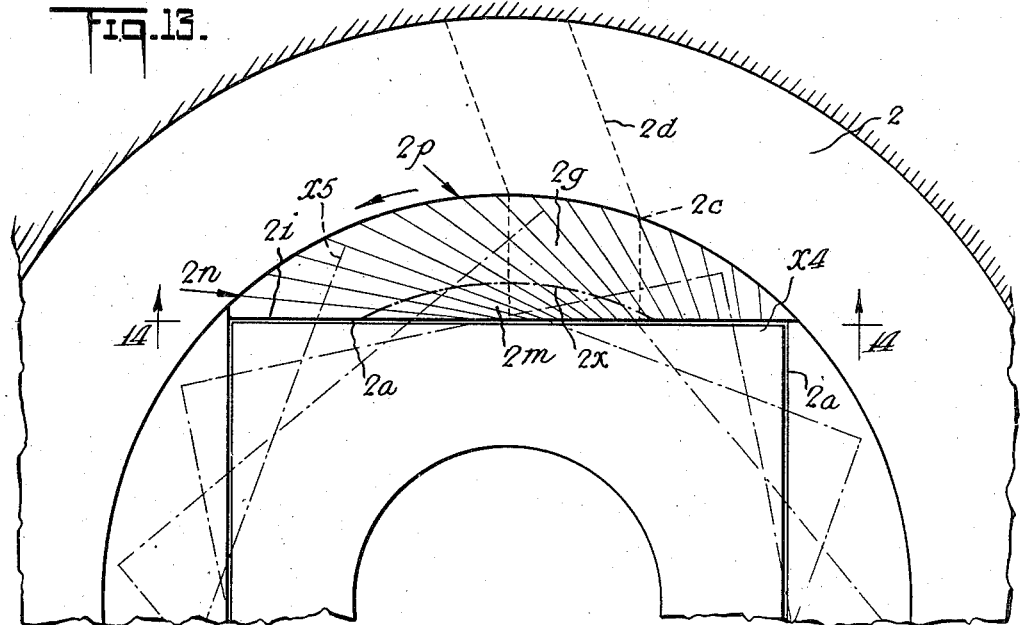
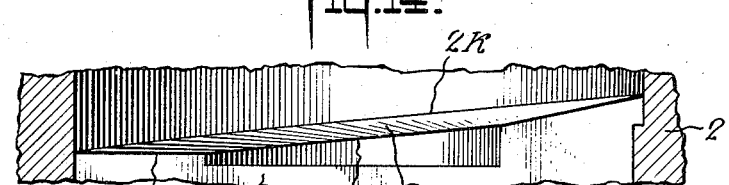
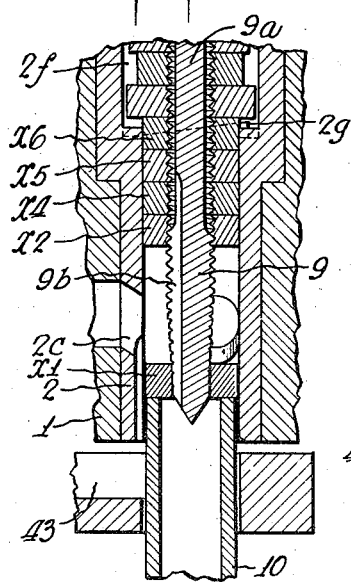
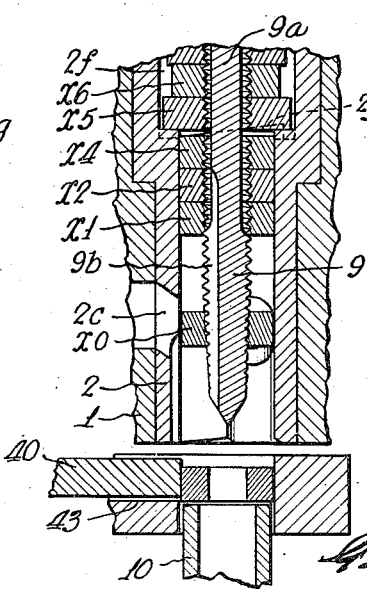
INVENTOR
John J. M<sup>c</sup>Laughlin
BY
George C. Reau
ATTORNEY Patented Oct. 25, 1938

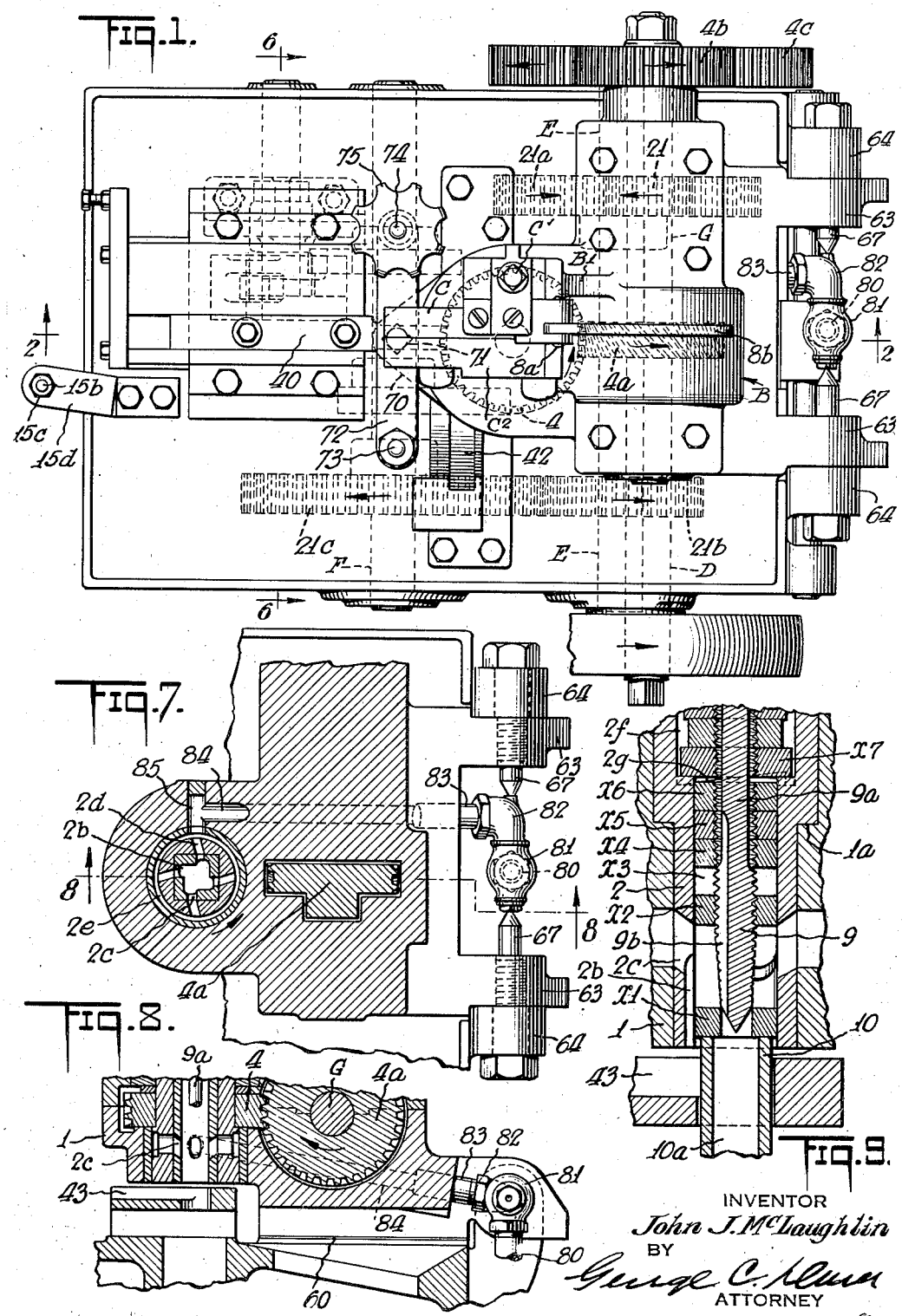

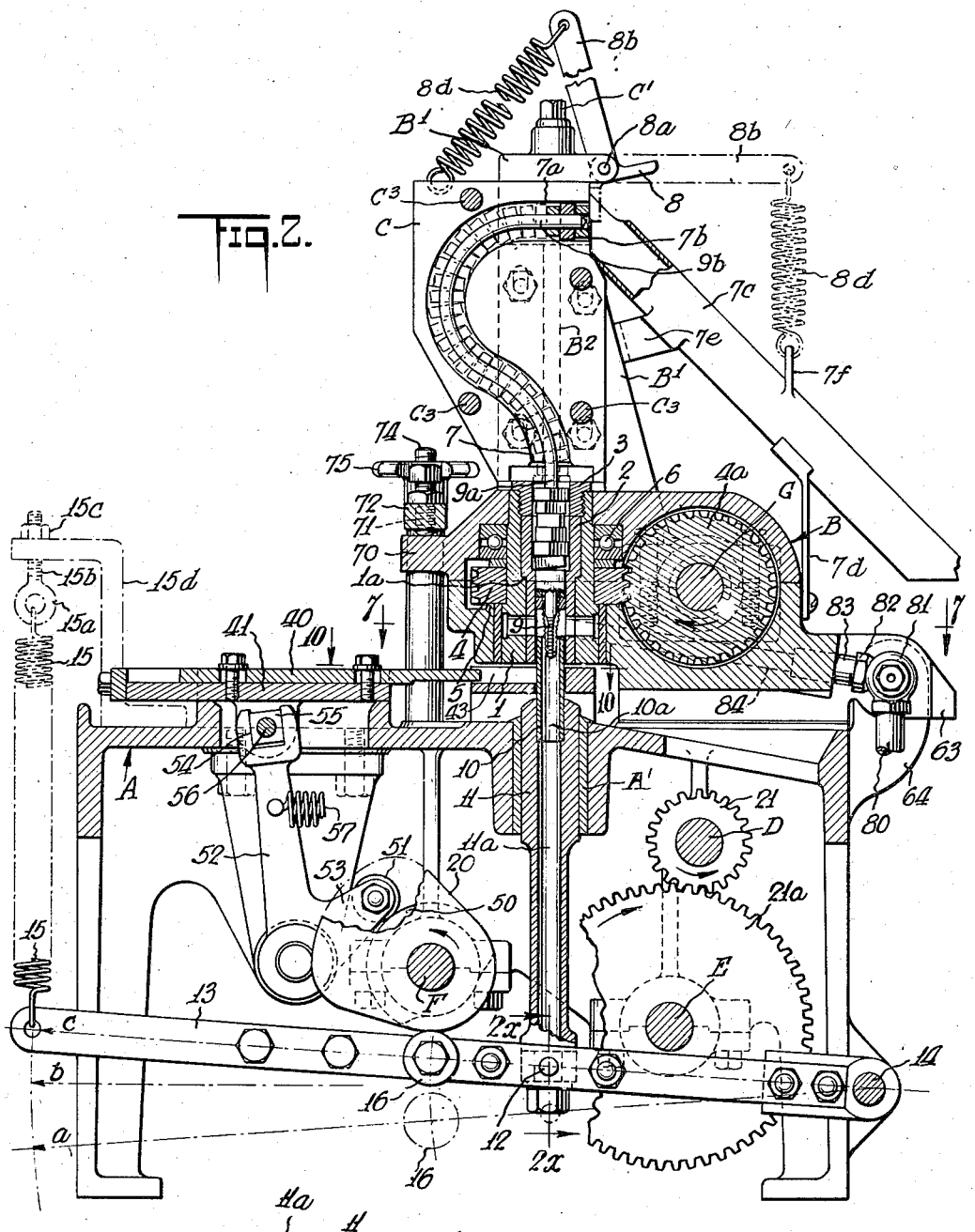

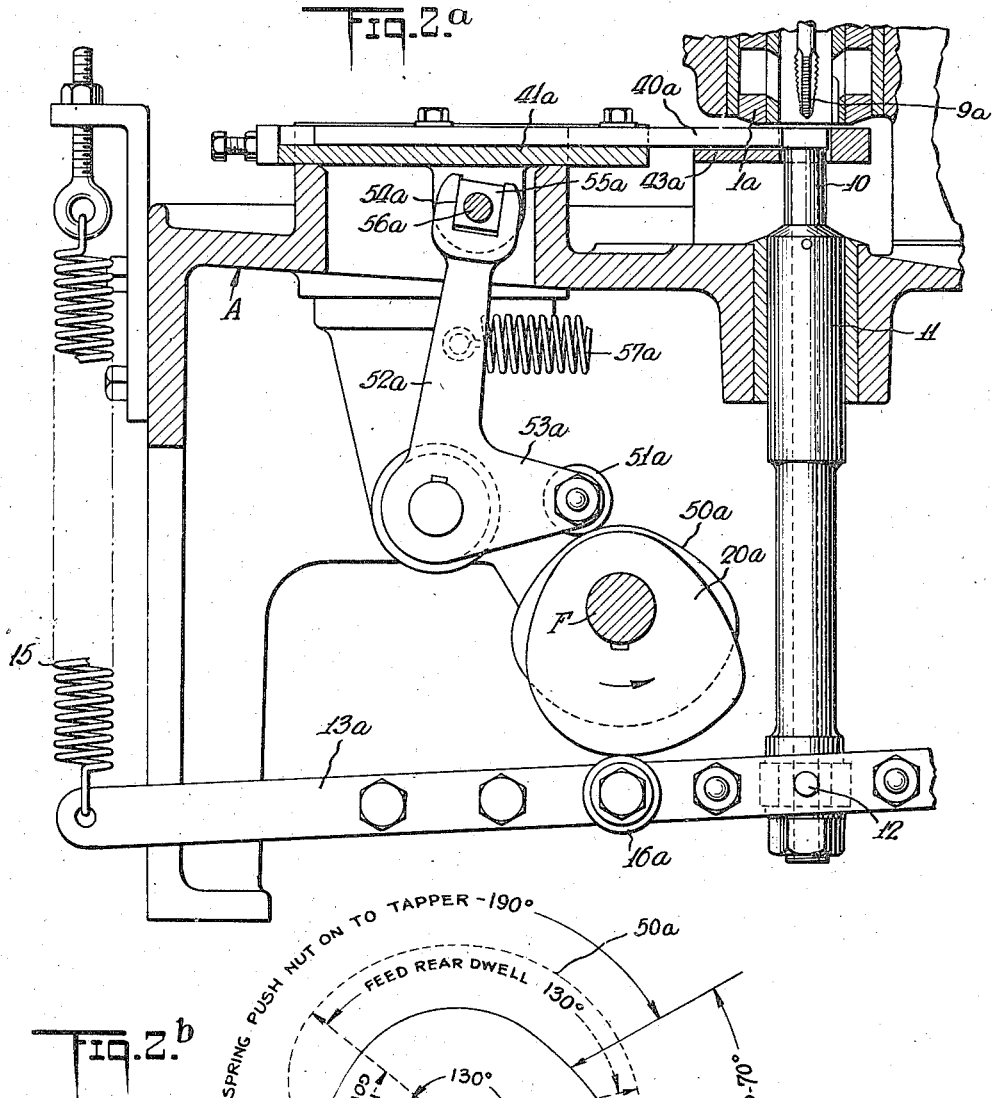
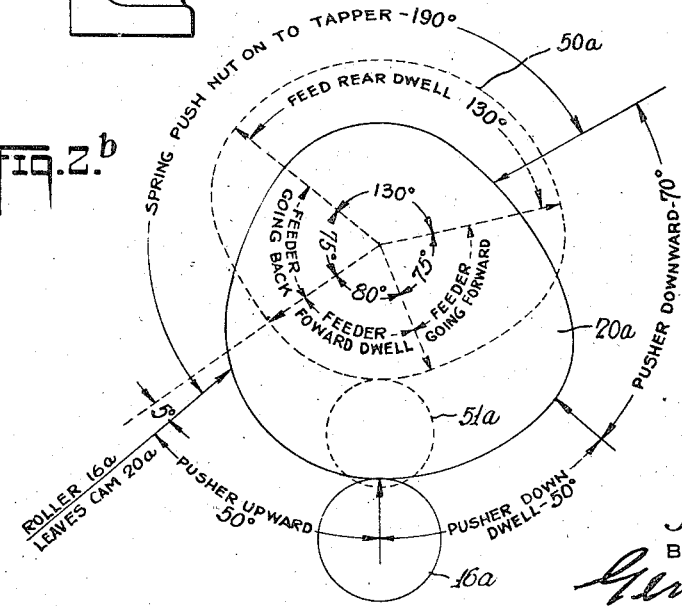

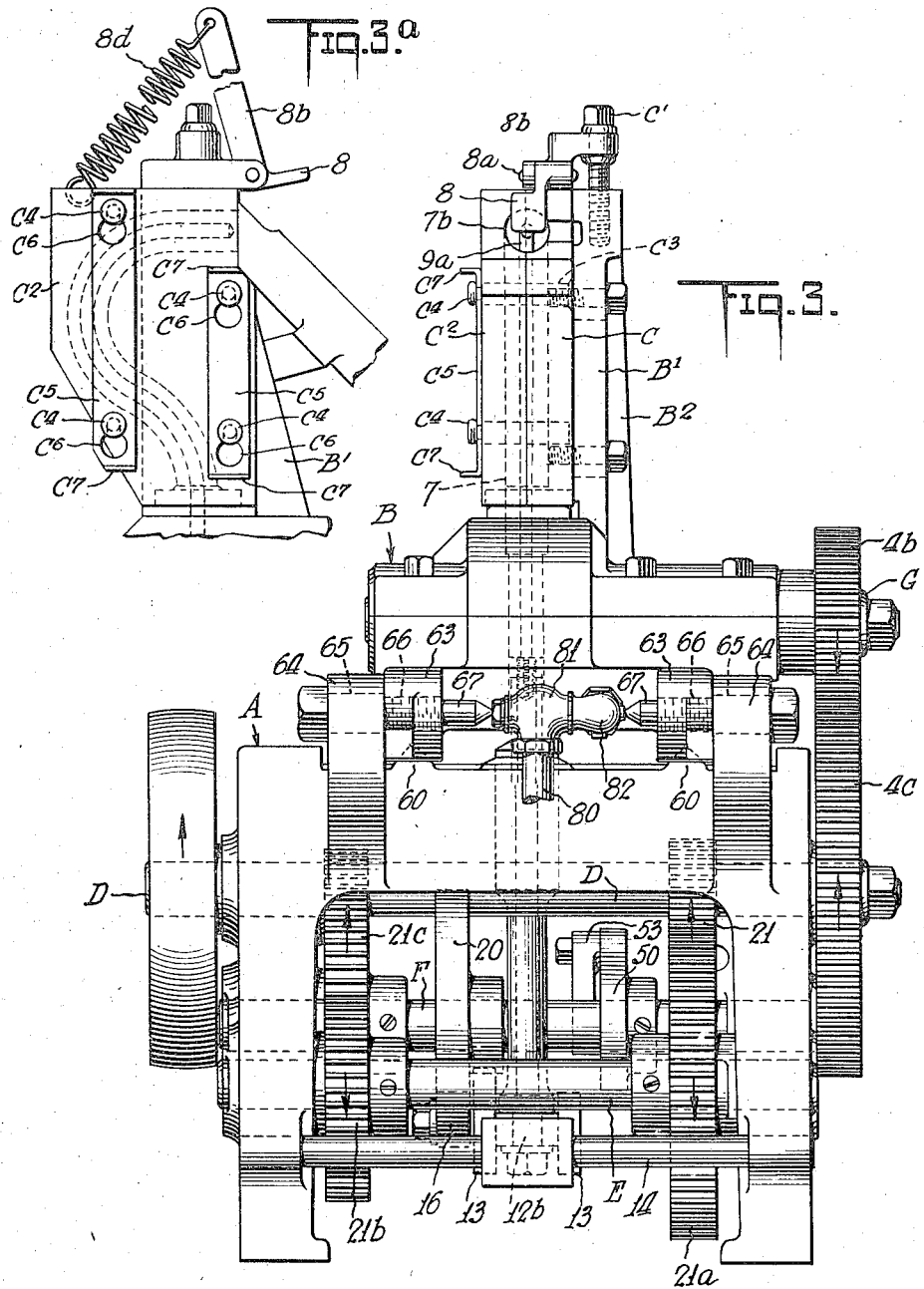

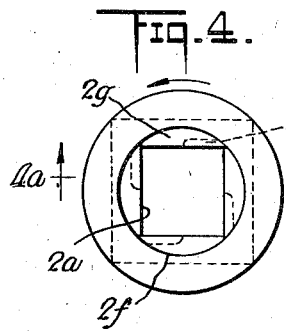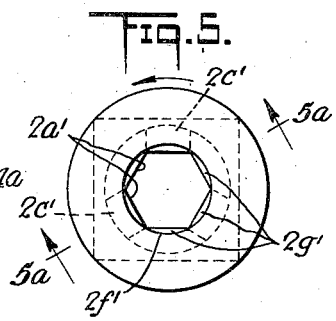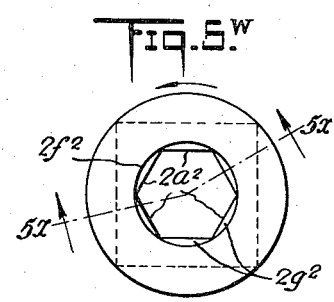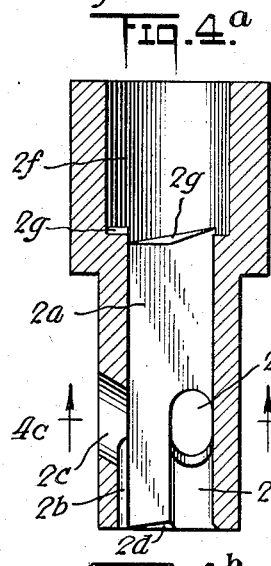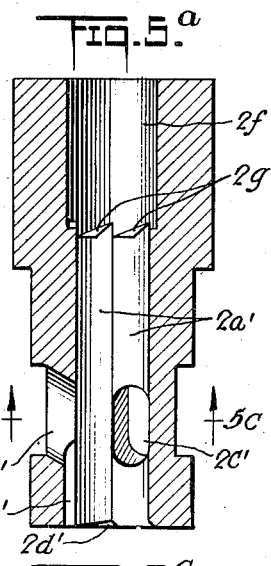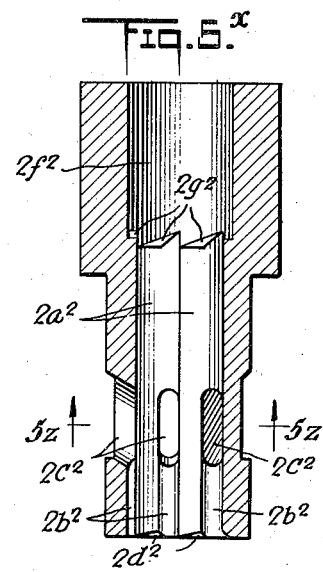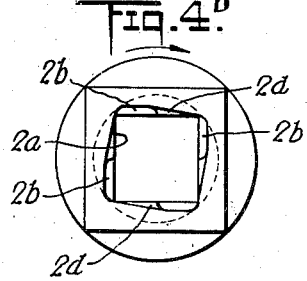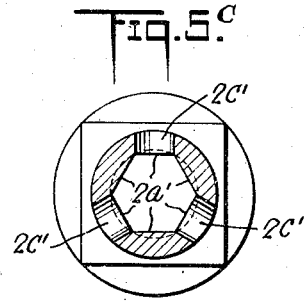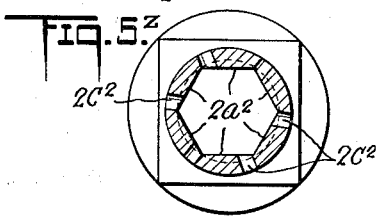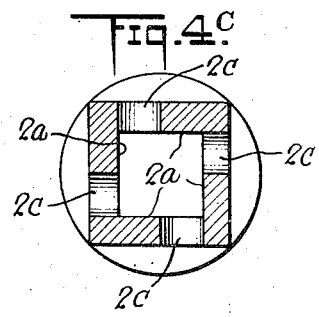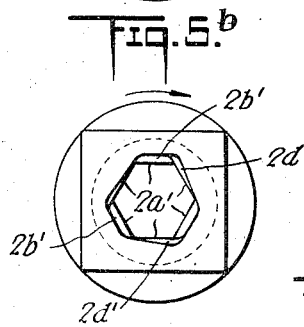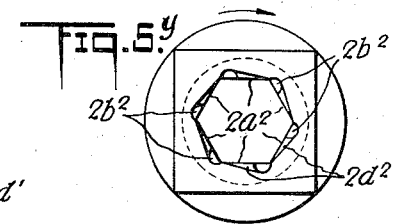

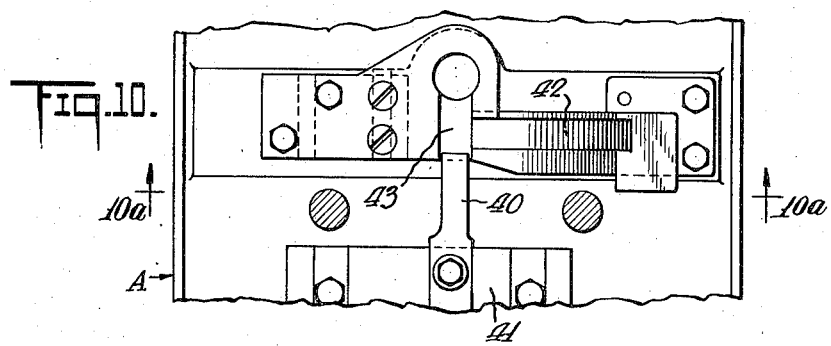
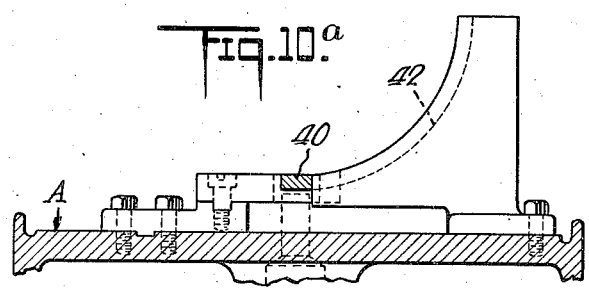
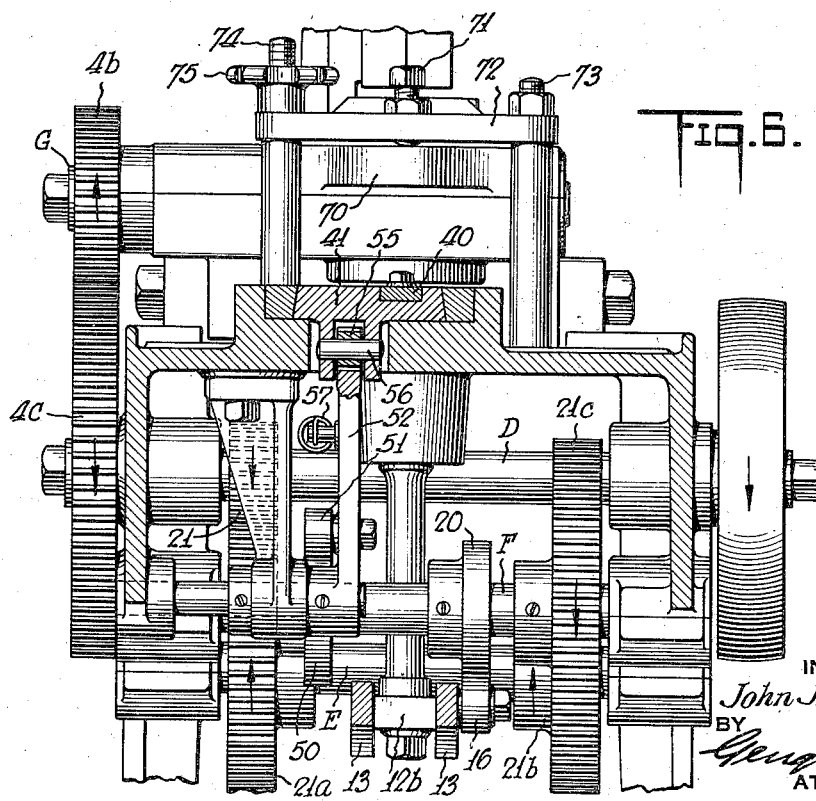

2,134,619

UNITED STATES PATENT OFFICE 2,134,619

NUT THREADING MACHINE

John J. McLaughlin, North Tonawanda, N. Y., assignor to Buffalo Bolt Company, North Tonawanda, N. Y., a corporation of New York Application January 10, 1936, Serial No. 58,467
Renewed September 10, 1938

19 Claims. (Cl. 10—139)

My present invention relates to machines for internally threading perforated nut blanks, particularly machines of the type in which a threading tap with a long shank is floatingly supported through the nuts which are being continuously threaded and pushed along the shank; the nuts themselves being supported by having their exterior surfaces or corners slidably engaging the walls of a guide passage. In machines of this type, an entrance portion of the guideway is in the form of a chuck that rotates the nut on the threading tap; and rotation of the tap by the nuts is prevented by having a rear portion of the shank and guide passage curved laterally at an angle to the axis of the tap portion.

Some machines of this type have the tap and chuck axis arranged horizontally and some vertically, but I have uncovered some difficulties which seem to be inherent in operation of the floating tap, regardless of whether horizontally or vertically arranged, as for instance, those resulting from back pressure of the column of tapped nuts driven through the guideway by successive nuts that are screwed off the rear of the tapping screw. Such back pressure on the nut, when and just after it is screwed off the tapping thread, presses the thin wedge-like rear end of the nut thread against the end of the hard steel thread of the tapper, thereby marring the thread and frequently spoiling the nut.

In either the horizontal or vertical arrangement of the tapper, curving the shank through only 90°, or less, may be desirable to the extent that the back pressure resulting from frictional resistance of the sliding nuts may be less; but certain features of my invention are particularly useful in connection with shanks and passages having curvature much greater than 90°, and particularly where there are reverse curves which greatly increase the total frictional resistance and resulting back pressure on the last tapped nut. Such back pressure is further increased where there is a detent yieldably opposing outlet of nuts at the exit end of the guide passage. Where the tap and chuck axis is vertical and guide passage extends upward, the weight of the column of tapped nuts applies back pressure.

For the above reasons, my invention is particularly applicable to machines in which the axis of tap and chuck is vertical; and the illustrative embodiment herein shown is a machine organized along lines somewhat analogous to the vertically tapping machine shown in Patent No. 1,656,286, granted Jan. 17, 1928.

One of the important objects of my invention is to relieve the nuts being threaded from the above described back pressure of the train of nuts on the shank by applying a lifting effort on the nuts near the bottom of the column preferably where they are forced out of the chuck; and/or by jarring them so as to make it easier for the nuts to maintain axial alignment with the shank and guide passage, particularly where they are pushed around the curves thereof. I provide means for accomplishing either or both these results by providing the upper end of the chuck with cam surfaces which engage the corners of successive nuts when each is pushed out of the chuck, and above mentioned resistances and back pressures applied to the upper surface thereof, stops its rotation or causes it to lag with respect to the cams carried by the rotating chuck. This cam action makes it practical to give the tap and guide passage sharper curves, curves through longer arcs, and reverse curves, without thereby imposing on the threaded nut, as the tapering rear end of the thread escapes from engagement with the last thread of the tap, any such pressure as would result in seriously deforming it.

Another object is to avoid undue endwise pressure on the tap of the threader, when the perforated blank is being pushed into engagement therewith. If the pusher rigidly applies such pressure at the end of a springy curved shank which is floatingly, or non-positively supported, it results in tendency of the shank to skew the tap out of alignment with the axis of the chuck. I have discovered, however, that such skewing may be practically eliminated by non-positively actuating the pusher by a constant pressure, the amount of said pressure being accurately predetermined with reference to the springiness of the shank. To this end the pusher is actuated to feed the nut onto the tap, by a long constant-pressure spring in combination with a cam designed to fix a positive limit to the distance the pusher can be forced by the spring; and to positively force swift withdrawal of the pusher after the nut has been pushed into the chuck and is fully engaged with the threads of the tap.

Minor objects of the invention are to supply the flooding lubricant to the longitudinal recesses in the chuck, through a swivel joint, coaxial with a hinge joint whereby the chuck tap and guide passage parts of the machine may be pivotally rotated away from the nut feed and pusher, without disconnecting the oil supply; also means for accurately guiding and locking said carrier in perfect registry with feeder and pusher.

The above and other features of my invention will be more fully understood from the following description in connection with the accompanying drawings, in which—

Fig. 1 is a plan view of the machine;

Fig. 2 is a vertical section of the machine on line 2—2, Fig. 1;

Fig. 2ˣ is a sectional detail on the line 2x—2x, Fig. 2;

Fig. 2ª is a vertical section, like Fig. 2 but showing modified arrangements and shapes for the nut-blank feeder and pusher cams;

Fig. 2ᵇ is a diagram showing approximately the phases and time relations of the movements produced by cams designed as in Fig. 2ª;

Fig. 3 is a front elevation, viewed from the right, Fig. 1;

Fig. 3ª is a front elevation of the upper part of Fig. 3, viewed from the right;

Figs. 4, 4ª, 4ᵇ and 4ᶜ are enlarged detail views of a preferred form of rotating chuck; Fig. 4 being a top plan view, Fig. 4ª a vertical section on the line 4a—4a, Fig. 4, Fig. 4ᵇ an upward view of the bottom of the chuck as shown in Fig. 4ª, and Fig. 4ᶜ a transverse section on the line 4c—4c, Fig. 4ª;

Figs. 5, 5ª, 5ᵇ and 5ᶜ are respectively similar views of a modified form of chuck adapted for hex nuts;

Figs. 5ʷ, 5ˣ, 5ʸ and 5ᶻ are respectively similar views of another form of chuck adapted for hex nuts;

Fig. 6, Sheet 6, is a front elevation of the machine, partly in section on line 6—6, Fig. 1;

Fig. 7, Sheet 1, is a horizontal section on the line 7—7, Fig. 2;

Fig. 8 is a vertical section on the line 8—8, Fig. 7;

Fig. 9, Sheet 1, and Figs. 11 and 12, Sheet 7, show parts of the nut chuck and tap in vertical section as in Fig. 2, but on a larger scale, and show sucessive different positions of the nuts on the tap;

Fig. 10 is a detail plan view of the nut feeder and guide, exposed by horizontal section on the line 10—10, Fig. 2;

Fig. 10ª is a vertical section on the line 10a—10a, Fig. 10;

Fig. 13 is a plan view of half a nut chuck greatly enlarged for diagramamtic purposes; and Fig. 14 is a vertical section on the line 14—14, Fig. 13, showing a modified form of chuck cam, as diagrammatically indicated in said Fig. 13.

In these drawings, Fig. 2 shows better than any other one figure the general organization of the machine, as to frame-work and most of the operating parts.

A horizontal table or bed A with suitable legs, serves as a support for driving mechanism below the table and work engaging mechanism above the table. A massive support member B pivoted to and tightly clamped on the top of the table, contains the nut tapping mechanism and has an upright member B' formed as a support and guide for vertically adjustable casing member C which contains the curved guide-passage in which the floating tap is supported by the tapped nuts.

The three shafts below table A, Fig. 2, are main drive shaft D, reducing gear countershaft E, and the cam shaft F operating the nut blank feeder and pusher; and above the table is the shaft G for rotating the nut chuck and tap in alignment with the pusher which pushes the nut blanks upward into the chuck and onto the tap.

The nut tapping parts carried by support B are shown in Fig. 2. The rotary chuck carrier 1 has an inner removable chuck 2 held against shoulder 1a by a screw bushing 3. The chuck is non-rotatably held in chuck carrier 1, preferably by a square lower portion, and it has an enlarged upper part which is preferably cylindrical. The chuck carrier has rigdly secured thereon a spiral gear 4 the lower surface of which engages an annular support surface 5 formed in a cavity of support B. Above the gear 4 is a ball bearing 6, to take the upward thrust applied to chuck gear 4, by driving gear 4a on shaft G, which latter is driven through pinion 4b (Figs. 1 and 3) meshing with gear 4c on main drive shaft D. As indicated in Fig. 2, driving gear 4a is a spiral gear, with the teeth skewed about 45° for engagement with similar skewed teeth on gear 4; so the transmission ratio is 1 to 1; and the direction of the skew is "left-hand", as is necessary for screwing the nut up, onto a "right-hand" threading tap.

The support B is horizontally divided at the level of the axis of shaft G, and the chuck carrier extends across that division line, thus permitting assembly of the parts in the positions above described.

In alignment with the upper outlet end of the chuck is a nut guide passage 7 opposite halves of which are formed in opposite, vertical, plane, inner surfaces of a support member comprising the vertically adjustable rear section C and the front section C² which is removable to permit access to guide passage 7. As shown in Figs. 3 and 3ª, removable front section C² is secured by stud bolts C³ projecting forward from rear section C. The outer ends of these bolts C³ are necked in as shown to form heads C⁴ of small enough diameter to permit sliding section C² forwardly off said bolts. When section C² is in position, it is secured by retaining strips C⁵, C⁵, key slotted as at C⁶. These retaining strips are provided with outbent ends C⁷ by which the strips may be forced upward to free the key slotted portion from the necks of bolts C⁴ and permit removal of said retaining strips and of said removable section C².

The guide passage 7 gradually curves through reverse bends to horizontal end portion 7a, terminating in an outlet 7b through which the nuts are discharged. The shape of these curves is predetermined by the curve desired for the shank of a floating nut tap 9. Arranged in the axis of nut chuck 2 is the screw tap 9 and its straight shank portion, 9a. This part is suspended and prevented from rotation by having its upper portion smoothly and gradually curved out of the axis of the chuck to an angle of about 30° from said axis, then reversely through a long circular arc, to a horizontal portion 9b, which is in the same plane with, and at right angles to, the axial line of the tap 9; and extends on both sides of said axial line, so as to afford maximum keying effect against rotation of tap 9, about said axis; also horizontal suspension for said tap and the vertical portion of the shank.

It will be obvious that the intermediate portion of the shank extends to a relatively great radial distance from said axial line of the chuck, while the free end extends across said axial line a relatively short distance. Consequently, the keying of the tap against rotation is effected almost entirely through the long arm radial leverage of the intermediate portions of the shank which lie wholly on one side of the axis; and any rotation about said axis, such as could result from looseness of the sliding fit of the nuts, will take effect on the tap only as a minute arc rotation thereof; and it will take effect on opposite, short-end, portion of the shank, only as short-arm leverage movement which will be proportionally less than the long-arm movement, and will be less than the maximum movement that would be permitted by the looseness of fit of the nuts at said point.

As the shank is more or less springy, and is centered only by the column of nuts which must be a loose sliding fit on the tap and the walls of the guide passage, it is desirable to provide for vertical adjustment of the tap end 9, relatively to the chuck 2, and to the range of movement of pusher 10 which pushes the nuts into the chuck and onto the tap. To this end the support C containing the curved section of the guideway is made adjustable on slide $B^2$, by means of screw $C^1$.

The nut pusher 10 is removably fitted in the end of plunger 11 which slides in guideway bearing $A^1$, in table A. The pusher 10 has a vertical axial passage 10a to accommodate the tap, as the pusher follows and levels the nut during the heavy work part of the threading. Equally important, is having passage 10a of large enough cross-section, to afford an ample outlet for chips from the tap and for the coolant lubricant liquid with which the chuck is flooded as explained below. As a continuation of this passage 10a, the plunger 11 is formed with a passage 11a discharging through outlet 11x in the lower end of the plunger, as shown more clearly in Fig. $2^x$.

The plunger is actuated by lever 13 having one end pivoted at 14 and the other end tensioned upward by spring 15. The details of the specific means for actuating plunger 11 by lever 13 is shown in Fig. $2^x$ as comprising trunnion pivots 12, 12, on an annular yoke 12a loosely fitting a reduced portion 11b, near the lower end of said plunger. The upward thrust of the yoke is against an annular shoulder 11c, and downward thrust is against washer 11d which is held in position by a nut 11e screwed upward on the end of the plunger. The fit of the yoke 12a between the collar 11c and washer 11d, as well as its fit about the reduced portion 11b, is loose enough to permit the very slight radial play required to permit right line vertical movement of plunger 11 when the lever 13 is moved through the relatively small arc required for operation of the plunger.

The lever 13 is positively actuated downward against the upward tension of spring 15 through an antifriction roller 16 on said lever 13, which roller engages the periphery of cam 20 on cam shaft F. Cam shaft F is rotated through reducing gears, comprising pinion 21 on main drive shaft D (see Fig. 3) meshing with gear 21a on countershaft E, which carries pinion 21b (see also Fig. 1) meshing with gear 21c on said cam shaft F.

Cam 20 is designed to cause the lever 13 to swing through the arc necessary to give the required amplitude of reciprocation for the pusher 10. The downward retracting movements of the lever and pusher, are the only movements that are forced by the cam. The upward pushing movements are actuated solely by spring 15. With such one-way-push cam, what would ordinarily be the pushing face is afforded by cam surfaces of decreasing radii which act merely as a patterned back stop to variably limit the successive heights to which spring 15 can force pusher 10.

The object is to make the spring 15 weak enough so that it cannot force roller 16 to follow the cam during the critical part of every cam cycle; that is when the pusher is pushing the nut into the chuck and is following it up to afford a true horizontal support surface during the heavy-work part of the thread-cutting. Merely making the spring weak enough transfers control of rates of further movement from the cam, to the nut which is being tapped, and its rate is controlled by the amount of work required for the lower end of the tap to partially tap the hole in the nut blank while it is getting into screwing engagement with the threads of the tap; and thereafter, by the pitch of the thread of the tap and the rate the chuck rotates the nut blank. Any weakness allowing such transfer of control is in itself desirable, but an equally important point is that the weakness of the spring may be predetermined or adjusted to the minimum desirable for supporting the tap against the forces tending to force the tap downward. Such forces on tap 9 tend to straighten the curved part of the shank, between the top of the chuck 2 and its horizontal support portion 9b. Such straightening of the shank tends to cause greater friction and back pressure of the column of tapped nuts in the upper guideway. It also tends to skew the tap out of the axis of the chuck and present the lower tip end of the tap at an angle and off center, with respect to the nut being pushed thereon.

The forces applying the downward thrust on the tap include: (a) the weight of all nuts turning idly on the top thread of the tap; (b) the weight of the entire upwardly extending part of the column of tapped nuts, during the times when a nut that is being screwed off at the upper end of the tap has to lift said column and force out the upper end nut through the outlet 7b; (c) the downward screw pressure applied by the nut being tapped, due to its frictional resistance to sliding on the surfaces of the chuck, as the nut is screwed upward on the tap.

The weakness of spring 15 is predetermined, to form an average required counterbalance for all of these downward pressures, and at the same time afford pressure sufficient to work the nut upward into screwing engagement with the threads of the tap.

To secure an optimum minimum tension suitable for counterbalance of these down pressures, I employ a long spring 15, designed for approximately the proper tension, with means for accurately adjusting its tension to near but safely above the required minimum. With a properly selected spring, a bolt with an eye 15a, threaded portions 15b, and nut 15c, engaging bracket 15d, may be sufficient for this purpose.

The use of my yieldable spring pusher would permit feeding the nuts at a very high rate but several important features of my invention depend on properly spacing the nuts on the tap; and this is accomplished by operating the feeder to supply nuts at intervals predetermined with reference to the rate that the chuck taps and screws the nut upward on the tap.

As shown on Fig. 2 by dotted line arrows a, b, c, the cam 20 positively forces the plunger-operating lever 13, from upper position c, to lowermost position a. On the return stroke the spring 15 makes it follow the retreat of the cam surface until the plunger encounters resistance due to pressing the nut blank into the socket and onto the tap. When this resistance is encountered, the lever 13 lags behind, out of contact with the surface of cam 20. The position of the lever at this time may be about that indicated by dotted line b, Fig. 2. Thereafter, the threader controls the rates of spring actuated upward movement until the lever roller 16 again engages the cam 20. This is preferably near the end of the minimum diameter arc of said cam, and may be about the position indicated by dotted line c.

A more precise understanding of phases of positive cam retraction of the pusher, and upward, spring-urged, tap-controlled movement when the roller 16 is out of contact with its cam, may be had by reference to Figs. 2a and 2b. Fig. 2a shows the same general relation of cam pusher and feeder as in Fig. 2, but the arrangement is modified so as to permit the use of smoother, longer curves on the cams. However, the arrangement is so similar to that in Fig. 2 that no specific separate description is required other than to note that the reference numerals are the same as those used on Fig. 2, plus an exponent a.

Disregarding the phase relations of the horizontal feeder cam 50a and examining the pusher cam 20a, it will be seen that in this particular case said cam 20a is contacting the anti-friction roller 16a on the pusher actuating lever 13a, at a point of the cam periphery where further anti-clockwise rotation presents surfaces of rapidly decreasing radii. The roller 16a follows the decreasing radii of the cam for 50° of this rotation, to a point where the pusher encounters the above described resistance and roller 16a leaves cam 20a. Thereafter, the upward movement of the pusher and nut thereon, is actuated by the spring, and controlled entirely by the rate of screwing of the nut upward on the tap, independently of the contour of the cam. Fig. 2b shows that in this particular case the roller 16a was out of contact with the cam, for more than a half revolution, 190°, and did not get back to again contact with the cam until substantially after the minimum radius of the cam had been passed. Thereafter the pusher is positively actuated downward for 70° and then there is a dwell in the down position for 50°; thus completing the 360° cycle.

From the above, it will be understood that under the spring actuation, the upper end of pusher 10 did not at any time travel upward as much as would have been permitted by the minimum radius of cam 20. As will be more fully explained below, this is because the extreme lower end of the tap is tapered and the thread is only partially formed for a number of revolutions before the thread in the nut is cut large enough to enable it to effectively reach a well formed thread on the tap and begin its true-screw progress upward. This will be more evident from consideration of specific speed ratios for the chuck and pusher, as follows:

A practical rate of operation for threading a ⅜" size nut, would involve feed of the nut blanks and pushing them out of the tap at a rate of about 50 per minute. Such rate of revolution for the cam shaft F may be effected by having the reduction ratio between larger gear 21c on said cam shaft F and a pinion 21b on countershaft E, about as shown, that is, about 2 to 1, so 50 revolutions for the cam would require about 100 revolutions for the countershaft E; and having the reduction between gear 21a on shaft E, and pinion 21 on main drive shaft D, about 3½ to 1. This would require about 350 revolutions per minute for said main drive shaft D to give 50 per minute for the push cam 20.

In order to have the chuck 2 screw the nuts up the threader at a rate which is the desired amount faster than they are supplied by the pusher, I have shown gear 4c, on the drive shaft D as having about twice the diameter of the pinion 4b, on spiral gear shaft G, so the supposed 350 revolutions predetermined as above for the main drive shaft D would give 700 revolutions for shaft G. The spiral gear 4a on shaft G is the same diameter, and its teeth have the same 45° angle as the gear 4 on the chuck holder 1, so chuck 2 will rotate at about 700 R. P. M. While revolution rates and speeds may be varied within wide limits, those above suggested are suitable in practical operation, and will serve as an illustrative example for convenience in explaining the broader underlying principles of construction and operation of various novel features of my invention.

The chuck as shown in Fig. 7, Sheet 1, and also in Figs. 4, 4a, 4b and 4c, Sheet 5, is formed interiorly with squared surfaces 2a for engaging and rotating the nut to screw it upward on the tap. Viewed in plan as in Figs. 5 and 7, the chuck rotates counter-clockwise, as indicated by the arrows. In the bottom surfaces of the chuck there are upwardly inclined surfaces 2d (Figs. 4a and 4b) whereby the corners of the upwardly pressed nut blank may make sliding approach engagement with the square chuck surfaces 2a. For a short distance upward from the bottom of the chuck the square surfaces 2a extend about half way across the side of the square and the other half is cut away to form vertical channels 2b for free flow of lubricant and washing down of chips. The lubricant is supplied through radial passages 2c, Fig. 4, in which said channels terminate; and above said holes the chuck is square. The supply passages 2c register with passages 2d in the chuck holder 1, as shown in Fig. 7. The latter passages preferably slant forwardly in the direction of rotation so as to assist in picking up lubricant supplied to an annular groove 2e cut in the exterior of the chuck, and closed in by the chuck bearing. The means for supplying lubricant to groove 2e will be described below.

The radial holes 2c, discharge into the chuck directly opposite an intermediate portion of the tap 9, as shown in Figs. 9, 11 and 12. The latter figures are the same, except that they show the pusher 10 at characteristically different phases of operation; and the nut blanks, in aproximately the vertical positions that they are supposed to have reached on a tap supposed to have 16 threads, when screwed up by a chuck rotating at the above suggested rate of 700, in combination with a nut supply of 50 per minute.

Such gear ratios would give 14 revolutions during the cycle between nut presentations; also the tap is shown as having about 16 threads. If there were no slip of the nut, 16 revolutions of the nut would bring its top surface to the level of the top of the tap. As the nut shown has about 3 threads, it would require 3 more revolutions to make a total of 19 revolutions, required for screwing one nut completely onto, along and off the tap.

In practice, however, there is likely to be some slip until the nut can come into true-screw engagement with threads of the tap; and the diagram, Fig. 2b, shows that the delay due to slip plus the time required to get the nut into the rapidly rotating chuck, may be considerable. Much will depend on sharpness of the tap, tension of the pusher spring, number of threads on the tap, gear ratios, other variables which are within the scope of my invention.

In Fig. 9, the lowermost nut X1, partly closes the bottom of the chuck. In this position, and also higher up during the heavy work of tapping, the cooling lubricant under pressure is free to flow downward through the tap grooves 9b (usually three in number) and through the chuck drainage grooves 2b, to lubricate and cool the tap, and to wash out all chips as fast ts they are formed. The same pressure also drives some of the cooling lubricant upward through the tap grooves 9b, into empty space X3, above nut X2, whence it may similarly flow through nuts X4, X5 and X6. From nut X6 it can escape into the enlarged passage 2f, whence there is free escape for overflow at the top of the chuck, through screw bushing 3 (Fig. 2). This situation continues through the position of nut X1, Fig. 11, and afterwards, until the lower surface of X1 uncovers the lower part of the inlet opening 2c.

When the nut reaches a typical midway position as shown at Xo, Fig. 12, the bottom is open not only for escape of lubricant from inlet 2c, but also for downflow of lubricant from all nuts, and all parts of the chuck above nut Xo.

After a few more turns, the nut Xo is screwed above the inlet openings so that the entire bottom of the chuck and the tap are exposed for washing and cooling by the lubricant.

Another feature of my invention concerns having a nut X4, Fig. 9, or X1, Fig. 12, relieved from back pressure of the train of threaded nuts on the upper part of the shank, both while the last end of its thread was being screwed off the tap, and while it is idly rotating on the top of the tap. As shown in Figs. 4 and 5, the squared, nut-rotating part of the chuck terminates at the upper end in a cylindrical passage of sufficient diameter to permit free rotation of the nuts. Where the square section changes to cylinder, there are upwardly presented surfaces or shoulders, and these surfaces are provided with cam surfaces, 2g, that slant upwardly and rearwardly. Figs. 9, 11 and 12 give a general idea of how these cams function. When nut X6, Fig. 9, is pushed high enough so that it can rotate slower than the chuck, its lower surfaces will be engaged and lifted by the cams. Until freed from the squared surfaces, the nut is being driven at the same speed as the chuck, say 700 R. P. M. as above suggested, but as soon as it is free, it will slow down or stop, because back pressure of the column of tapped nuts in the upper guide way, applies friction on its upper surface. The 700 R. P. M. cams will then be rotating relatively to the more slowly rotating nut, and will exert a lifting effect thereon, so that nuts X4, X5, X6, below lifted nut X7, will be relieved of this load. This is important as concerns each lower nut at and near the time the lower end of its thread is being screwed off the tap, and is so likely to be marred if pressed downward on the top thread of the tap.

If the sliding resistances between the cams and the cam-lifted nut X7 are great enough, the said nut may stick on the upper part of the cams and rotate with them, thus affording constant level support for the nuts above it, and relief for all nuts below it, until the next lower nut is pushed up to take its place. In some cases, each nut may be subjected to a succession of cam lifts; but in most cases the chuck rotation will be rapid enough to cause the cammed nut to practically float on the tips of cams. Even if they are slow enough to allow drop of the cammed nut from tip to valley, the column of nuts above it will be jarred enough to facilitate alignment of their aces with the curving axis of the guide way and shank, thereby minimizing friction, sticking and back pressure.

A better idea of the sequence of this operation may be had by considering Fig. 9, where nut X4 is shown in characteristic position after it has been screwed off of the tap and is rotating idly on the upper end of the tap, free of all load except the nuts X5, X6; because nut X7 has been lifted by the cams, and is supporting all the nuts above it. Nut X2, which is being rapidly screwed upward on the tap, is shown in a position where about three more revolutions will bring its upper surface into contact with the bottom of nut X4. The distance between the top of the tap and the bottom of the cams 2g, is predetermined or adjusted with reference to the thickness of the nuts, so that nut X6 will be supported with its upper surface just above the bottoms of the cams. About two more revolutions of nut X2 from the position shown in Fig. 9 will screw-elevate the bottom of nut X6 above the bottoms of cams 2g. Thereafter relative rotation as above described, will slide the cams under nut X6 and cam it upward to take the place of X7. Nut X6 then becomes the lowermost of the column of tapped nuts to be supported and lifted.

Fig. 11 shows the nut X2 at a time when it has lifted X6 half way up. At this instant the weight of the entire column of nuts is being supported by nut X2, but X2 is then screwing on the tap threads and is in no danger of being marred.

Any reasonable approximation of the above timing and spacing of nuts on the tap, will ensure at least one nut that is tightly screwed on the tap and is in firm engagement with the walls of the socket so that it tends to center and align the tap at the time a new nut is presented. For instance, in the special case shown in Fig. 9, the nut X2 is in very favorable centering and aligning position, while nut X1 is being pushed on the cone end of the tap and is being screwed up the first four or five threads. After nut X1 has been firmly screwed on the tap, said nut X1 itself has a centering and aligning effect, due to the true-plane horizontal surface of the pusher which is being spring pressed against the bottom of said nut, with a force which is at least equal to that of all of the above described down-thrust forces that may be acting on the tap.

Preferably the nuts are automatically applied to the pusher 10 by feeder 40 adjustably mounted on a carriage 41, slidably mounted on table A. Nuts are supplied to the feeder by a column of nuts maintained in the guide 42 (see Figs. 10 and 10a), from which they slide by gravity into guideway 43, as soon as feeder 40 is retracted. As this feeder must operate alternately and non-interferingly with the pusher, the cam 50 for operating it is also on shaft F which carries the pusher cam 20. This cam 50 engages a roller 51 on arm 53 having another arm 52 in bell crank relation thereto, the arm 52 having at the upper end a fork slide 54 engaging a slide 55 which rotatably engages pivot 56, on the feed slide 41.

As shown in Fig. 2, arm 52 is tensioned toward the cam 50 by helical spring 57 so that the forward movements of feeder 40 are spring actuated and the retracting movements are forced by the cam. As shown in Fig. 2a the adjustments are preferably such that when feeder bar 40a is all the way forward where the nut pushed thereby is in proper relation to the vertical end surface which guides the nut upward, the roller 51a will be in contact with cam 50a and the end of said bar will exert no pressure on the nut, but will act merely as fixed guide to locate the nut on the pusher 10a, until the pusher has lifted the nut. However, being forced to follow cam 50a, only by pressure of spring 57a, it can yield and avoid breakage of parts in case of accident. The pusher 10 is of slightly less diameter than the nut, and when feeder 40a is properly adjusted as above described, roller 51a will be so near cam 50a, that it will contact therewith and stop further forward movement before the feeder contacts with the side of pusher 10. As shown in the diagram, Fig. 2b, the feeder roll 51a remains in its forward nut-guiding position for 80 degrees rotation of its cam 50a, and this covers all the time the pusher moves upward and lifts the nut to a level where resistance due to encountering the chuck and tap, causes pusher roll 16a to leave the surface of cam 20a; and it continues in said nut guiding position for a further time which, in this particular case is indicated as a 5 degree overlap. Thereafter cam 50a acts positively to force withdrawal of feeder 40a.

The time period required for a complete cycle of nut feeder movements must be the same as required for a complete cycle of the pusher, though phases of their movements are opposite; so the feeder cam 50 and pusher cam 20 are preferably on the same shaft F.

The massive support B may be secured in any desired way, but as shown in Fig. 3, it preferably is supported on two parallel V-shaped rails 60 which are formed or fixed on the upper surface of the table A. Similarly shaped grooves in the bottom of the support B fit the diverging surfaces of the rails 60, as indicated in dotted lines. This ensures accurate alignment of the nut tapping mechanism with the nut feeding and pushing mechanisms. Support B is held and further located by the massive hinge joint shown at the front of the table, Figs. 1 and 3. The hinge comprises two massive lugs 63, rigid with support B, and two cooperating lugs 64, rigid with the table A. Both pairs of lugs are perforated but the outside lugs have smooth bearing surfaces 65, 65, and the inside lugs are threaded at 66 and have screwed and locked therein two oppositely extending stud-like pivot pins 67, 67. As shown in Fig. 6, the rearward end of support B is formed with a lug 70 which extends under thrust screw 71 on a clamping bar 72, which forces and locks support B down on the V-shaped rails 60. The clamp 72 swings on stud 73 at one end, its other end being clamped on screw-threaded stud 74 by a hand-operated nut 75 which can be loosened to permit swinging of clamp 72 away from lug 70 so that the support B can be freely rotated on its hinge joint to expose the chuck, the nut blank passages, feeder and pusher.

Ordinarily the threaded nuts are discharged from the outlet 7b into a chute 7c held in position by a bracket 7d screwed to the massive support member B, and a bracket 7e secured to upright B¹. When said supports are swung as a unit, on the hinge joint as above described, the chute will move with said support. To prevent escape of the nuts when the support is thus rotated, I may employ a gate or detent 8 pivoted at 8a having an arm 8b in bell crank relation thereto. As shown in Fig. 2, this detent is normally held in inoperative position, so that it cannot apply any back pressure on the train of threaded nuts which are being forced along shank 9a during all normal operation of the machine. It is held in this normally inoperative position by spring 8d, engaging support C. When the support is to be rotated about the horizontal pivot for any of the purposes described, the bell crank is swung to the position shown in dotted lines Fig. 2, and the spring 8d is hooked to a suitable engaging device 7f on chute 7c.

As best shown in Figs. 3 and 7, the cooling and lubricating liquid is supplied to chuck 2 through a pipe 80 terminating in a large sleeve 81 which is one member of a swivel pipe coupling. The other member 82 is rotatably held with its axis in the axis of pivot 67, by cone bearings formed on the end of the studs. As shown in plan view Fig. 7, the pipe member 82 terminates at one end in an elbow discharging through pipe 83 screwed into support B, which discharges through passage 84 drilled from the rear through the support, to a transverse passage 85 drilled into and communicating with oil groove 2e, which supplies the passages leading to the chuck.

Referring again to the chuck cams (Figs. 4 and 9) it will be noted that vertical adjustment of the tap 9 by screw C′, Fig. 2, must be accurate enough to have nut X6 stop with its upper surface at a level low enough to leave the cams 2g projecting above it, enough to lift nut X7 out of contact with nut X6, and at the same time make sure that nut X7 is pushed high enough so that it surely is able to lag circumferentially and project radially into the path of cam surfaces 2g. In the illustrative case shown in the present drawings, a cam lift answering the above requirements would be about two threads of the tap.

While such cam lift may be embodied in variously formed cam surfaces, even perfectly plane inclined surfaces such as indicated in Figs. 9, 11 and 12, I have found that the cam pitch required to give sufficient cam lift may involve undesirably steep pitch for some parts of the cam surfaces. This is particularly true where the nut thread is coarse in proportion to the width of a chuck face. The coarser the thread, the greater the vertical cam lift required for a given cam lift, say, two threads; and the smaller the width of the chuck faces the less will be the available base line within which such lift must be effected. These and other limitations may be better understood by reference to Figs. 13 and 14, Sheet 7.

Fig. 13 is a much enlarged plan view of a chuck for a square nut, such as shown in Figs. 9, 11 and 12. This being a plan view, the pitch of the cam surface 2g is not visible, and the area and length of base available for the cam (along line 2i) appears the same as it would for any differently pitched surfaces, as, for instance, the surfaces 2g as shown in Figs. 4, 4a, 4b and 4c, sheet 5. Thus viewed, Fig. 13 shows that a close fitting nut has its edge nearly parallel with the plane of chuck face 2a. The diverging lines, such as 2n, 2p, show the acute shear-angles at which the edge of a rotating nut will cut the plane of said vertical face of the chuck. The acute shear-angles of these lines show that when the cams have plane inclined faces, such as shown in Fig. 9, relative rotation between cam and nut through even the 5° angle between 2i and 2p, Fig. 13, requires the lower edge of the nut to shear across the edge of the cam, nearly to the center of the face of the chuck, at 2m. Moreover, these shearing lines continue unduly crowded for a considerable distance beyond 2m.

More generally stated, these shear lines show that when the cam surface is an inclined plane, a close fitting nut will have its edge so nearly parallel to the edge of the cam that the lower face of the nut might have to rise half, or more than half, the height of the cam and clear the center of the squared surface at $2m$, Fig. 13, before it will get a chance to present a fair wedging angle to the edge of the cam. If the lower face of nut X7, Fig. 9, Sheet 1, had to be lifted that high by the nut X6 before it could reach a fair wedging angle and begin to lift the load of tapped nuts above it, only the upper half of the cam surface would be available for lifting, and if the cam lift is to be two threads of the nut, the cam surface would have to be correspondingly steep. Less than two threads of cam rise would make it necessary to have very close limits of accurate vertical adjustment for tap 9 in order to be sure that the lifted nut X7 would be held safely above and out of contact with nut X6.

In this connection, it is to be remembered that only a non-positive frictional retardation of the nut is available for making it lag behind and permit relative rotation with respect to the cam; and for this reason the pitch of the cam ought not to be very steep; also if only one half of a low pitch cam is available, the adjustment of the tap must be correspondingly accurate.

One way of improving this situation is to make the front edge of the lower half of the cam horizontal out to the midway point $2m$ and to make the outer, circular edge of the cam surface helical as shown in Fig. 4$^a$. With such a cam the nut is released for rotation the instant its lower surface rises above the level of said horizontal edge.

The same principle may be carried further. Fig. 14 shows that the shear lines remain unduly crowded for a considerable distance beyond the center of the cam edge, at $2m$; and by simply putting the chuck in the lathe and turning out a cylindrical relief cavity, say, to the dotted line $2x$, Fig. 13, the worst of the crowding of the shear lines may be eliminated.

This is clearly shown in Fig. 14 where the cam edge $2i$ is made horizontal as above described, and the cylindrical cavity $2x$ results in having the inner edge of this middle half of the cam of only slightly greater pitch than the peripheral helical line at $2k$. Thus, in Fig. 14, there are no very acute shear lines of crossing of the edge of the nut, so relative rotation and cam lift is correspondingly easy. Also the full height of the cam is effective, either for greater cam lift, or for wider latitude in getting safely operative vertical adjustment for the top of the tap 9 with respect to the bottoms of the cams. In either case, for whatever part of a cam (such as shown in Fig. 14) is left projecting above a lower, lifting nut (such as X4, Fig. 12), equal angles of relative rotation of the lifted nut (such as X5) will give it corresponding equal heights of cam lift.

The same principles, or modifications thereof, may be embodied in six-sided chucks for hex nuts as will be evident by comparing corresponding figures of the square nut chuck with the two forms of hex chuck shown in parallel vertical columns on Sheet 5. To facilitate comparison of the similarities, similar reference characters have been used on all figures to indicate similar parts, but for Figs. 5, 5$^a$, 5$^b$ and 5$^c$ a "prime" mark has been added; and for Figs. 5$^w$, 5$^x$, 5$^y$ and 5$^z$, "2" has been used in place of the "prime".

In said Figs. 5$^w$, 5$^x$, 5$^y$ and 5$^z$, the construction and function of all parts for the hex nut is substantially the same as for the square nut chuck except that there are six driving faces instead of four; also the six oil inlet holes $2c^2$ and passages $2b^2$ are narrower. The cam surfaces $2g'$ are shown as having the horizontal entrance lines at the base of the cam, in combination with the helical peripheral edges and the configuration of the cam surfaces may be the same as in Fig. 14; also the central sector of each chuck face cut away to a cylinder, as described in connection with Fig. 14.

The same things are true of the form of hex chuck shown in Figs. 5$^a$, 5$^b$ and 5$^c$, as concerns all parts above the level of the oil inlet holes $2c'$. Below this level, however, there are only three driving surfaces because there are only three inlets $2c'$ and drainage passages $2b'$; and both of these are so wide that the three intermediate driving surfaces are entirely cut away.

While I have described with great particularity desirable illustrative embodiments of my invention, and ways of operating the same, including details of usable and preferred cycles for the vertical pusher and for the horizontal feeder; usable and desirable speed ratios for the nut rotating chuck, nut pusher and nut feeder; and usable and desirable speeds for said ratios; it will nevertheless be understood that all of these may be widely varied without departure from the novel fundamentals of my invention.

I claim:

1. A nut threading machine, including in combination, a rotary open-ended chuck having surfaces for engaging and rotating nuts sliding therethrough, a tap with a long shank having a straight portion positioned in the axis of the chuck by the nuts which are being rotated by said chuck, a curved portion extending laterally away from the axis of the chuck in a curve of large radius, and thereabove an approximately horizontal portions; together with a stationary guideway affording nut guiding surfaces approximately parallel with curved and horizontal portions of said shank, whereby said stationary guiding surfaces floatingly center and support said shank through a train of previously threaded nuts that are forced along the shank, whereby to position and prevent axial rotation of the tap in the chuck; a pusher reciprocable in alignment with the chuck, said pusher having an axial passage to receive the tap, and its nut pushing end formed to support the rear face of the nut blank in a plane at right angles to the axis of the chuck; means for reciprocating said pusher including a rotary cam adapted to positively retract the pusher and a spring adapted to actuate the pusher toward the tap in accordance with the cam contour, but having its spring pressure adjusted in counterbalance relation to back pressure on the tap so that when the nut on the pusher is engaged with the tap, the rates of movement of the pusher will be controlled by said back pressure independently of the cam contour; means for operating the pusher reciprocating means at intervals sufficient to space apart successive nuts on the tap at least half the thickness of a nut; means near the exit end of the chuck arranged to successively engage threaded nuts and push them forward to relieve nuts in the rear thereof from back pressure of the train of threaded nuts on the guideway; and means for cooling and lubricating the tap including inlet openings through the walls of the chuck discharging lubricant into the chuck, opposite the central portion of the tap, said openings extending opposite the threads of the tap a distance substantially greater than the thickness of the nuts.

2. A nut threading machine, including in combination, an upwardly extending rotary chuck having surfaces for engaging and rotating nuts sliding therethrough, a tap with a long shank having a straight portion positioned in the axis of the chuck by nuts that are being rotated by said chuck, and a curved portion extending upward and laterally away from the axis of the chuck in a curve of large radius, and thereabove an approximately horizontal portion; together with a stationary guideway affording nut guiding surfaces approximately parallel with curved and horizontal portions of said shank, whereby said stationary guiding surfaces floatingly center and support said shank through a train of previously threaded nuts that are forced along the shank, thereby suspending and preventing axial rotation of the tap in the chuck; means above the tap for lifting a superposed train of threaded nuts, independently of nuts being threaded on the tap; a pusher reciprocable in alignment with the chuck, said pusher having an axial passage to receive the tap, and its nut pushing end formed to support the rear surface of each successive nut in a plane at right angles to the axis of the chuck; means for reciprocating said pusher including a rotary cam adapted to postively retract the pusher and a spring adapted to actuate the pusher toward the tap in accordance with the cam contour, but having its spring pressure adjusted so as to exert upward pressure on each successive nut, said pressure being a predetermined minimum sufficient to support and advance such nut upward on the receiving end of the tap while said nut is being screwed into self-feeding engagement with said tap.

3. A nut threading machine, including in combination, a rotary open-ended chuck having surfaces for engaging and rotating nuts sliding therethrough, a tap with a long shank having a straight portion positioned in the axis of the chuck by the nuts which are being rotated by said chuck, a curved portion extending laterally away from the axis of the chuck in a curve of large radius, and thereabove an approximately horizontal portion; together with a stationary guideway affording nut guiding surfaces approximately parallel with curved and horizontal portions of said shank, whereby said stationary guiding surfaces floatingly center and support said shank through a train of previously threaded nuts that are forced along the shank, thereby to position and prevent axial rotation of the tap in the chuck; a nut pusher and means for reciprocating it in alignment with the chuck, said means including a rotary cam adapted to positively retract the pusher and a spring adapted to actuate the pusher toward the tap in accordance with the cam contour but having its spring pressure adjusted in counterbalance relation to back pressure on the tap so that when the nut on the pusher is engaged with the tap, the rates of movement of the pusher will be controlled by said back pressure independently of the cam contour; and means for cooling and lubricating the tap including inlet openings through the walls of the chuck discharging lubricant into the chuck opposite the threaded portion of the tap.

4. A nut threading machine, including in combination, a rotary open-ended chuck having surfaces for engaging and rotating nuts sliding therethrough, a tap with a long shank having a straight portion positioned in the axis of the chuck by the nuts which are being rotated by said chuck, a curved portion extending laterally away from the axis of the chuck in a curve of large radius, and thereabove an approximately horizontal portion; together with a stationary guideway affording nut guiding surfaces approximately parallel with curved and horizontal portions of said shank, whereby said stationary guiding surfaces floatingly center and support said shank through a train of previously threaded nuts that are forced along the shank, thereby to position and prevent axial rotation of the tap in the chuck; said tap having a tapered receiving end on which the central opening of the nut is initially tapped for a substantial distance before threading becomes effective for screw-feeding of the nut; a nut pusher and means for reciprocating it in alignment with the chuck, said means including a rotary cam adapted to positively retract the pusher and a spring adapted to actuate the pusher toward the tap in accordance with the cam contour, but having its spring pressure adjusted so as to exert the requisite pressure on each successive nut to advance it along the receiving end of the tap during said initial tapping, and until the nut and tap are brought into effective screw feed relation; and means for rotating the cam at rates so that one nut will be near but not beyond the finishing end of the tap when the next nut is pushed on the tip thereof.

5. A nut threading machine, including in combination, an upwardly extending rotary chuck having surfaces for engaging and rotating nuts sliding therethrough, a tap with a long shank having a straight portion positioned in the axis of the chuck by the nuts which are being rotated by said chuck, a curved portion extending upward and laterally away from the axis of the chuck in a curve of large radius, and thereabove a portion curving circularly and reversely to an approximately horizontal portion which crosses the axial line of the chuck; together with a stationary guideway affording nut guiding surfaces approximately parallel with reversely curving and horizontal portions of said shank, whereby said stationary guiding surfaces center and floatingly support a train of previously threaded nuts that are forced along the shank, thereby to suspend said shank and tap and prevent axial rotation of the tap in the chuck; said tap having a tapered receiving end on which the nut is partially tapped before screw threading becomes effective for screw-feeding of the nut; a pusher reciprocable upward in alignment with the chuck, said pusher having an axial passage to receive the tap and afford down drainage for the lubricant and chips; means for reciprocating said pusher including means positively forcing its downward movements and a spring non-positively actuating its upward movements, but having its spring pressure adjusted so as to exert the requisite pressure on each successive nut to advance it along the receiving end of the tap during said initial tapping and until the nut and tap are brought into effective screw feed relation.

6. A nut threading machine, including in combination, an upwardly extending rotary chuck having surfaces for engaging and rotating nuts sliding therethrough, a tap with a long shank having a straight portion positioned in the axis of the chuck by the nuts which are being rotated by said chuck, a curved portion extending upward and laterally away from the axis of the chuck in a curve of large radius, and thereabove a portion curving circularly and reversely to an approximately horizontal portion which crosses the axial line of the chuck; together with a stationary guideway affording nut guiding surfaces approximately parallel with reversely curving and horizontal portions of said shank, whereby said stationary guiding surfaces center and floatingly support a train of previously threaded nuts that are forced along the shank, thereby to suspend said shank and tap and prevent axial rotation of the tap in the chuck; a pusher reciprocable upward in alignment with the chuck, said pusher having an axial passage to receive the tap and afford down drainage for the lubricant and chips; means for reciprocating said pusher including means positively forcing its downward movements and a spring non-positively actuating its upward movements, but having its spring pressure adjusted in counterbalanced relation to the back pressures on the tap and weak enough so that the rates of upward movements of the pusher will be controlled by the rate of screwing of the nut on the tap; means for operating the pusher reciprocating means at rates insuring substantial spaces between successive nuts on the tap; and means for cooling and lubricating the tap including inlet openings discharging lubricant into the chuck, through the side of the chuck, opposite the threads of the tap.

7. A nut threading machine, including in combination, an upwardly extending rotary chuck having surfaces for engaging and rotating nuts sliding therethrough, a tap with a long shank having a straight portion positioned in the axis of the chuck by the nuts which are being rotated by said chuck, a curved portion extending upward and laterally away from the axis of the chuck in a curve of large radius, and thereabove a portion curving circularly and reversely to an approximately horizontal portion which crosses the axial line of the chuck; together with a stationary guideway affording nut guiding surfaces approximately parallel with reversely curving and horizontal portions of said shank, whereby said stationary guiding surfaces center and floatingly support a train of previously threaded nuts that are forced along the shank, thereby to suspend said shank and tap and prevent axial rotation of the tap in the chuck; a pusher reciprocable upward in alignment with the chuck, said pusher having an axial passage to receive the tap and afford down drainage for the lubricant and chips; means for reciprocating said pusher including means positively forcing its downward movements and a spring non-positively actuating its upward movements, but having its spring pressure adjusted in counterbalanced relation to the back pressures on the tap and weak enough so that the rates of upward movements of the pusher will be controlled by the rate of screwing of the nut on the tap; means for operating the pusher reciprocating means at rates insuring substantial spaces between successive nuts on the tap; and means for cooling and lubricating the tap including inlet openings discharging lubricant into the chuck, through the side of the chuck, opposite the threads of the tap, said openings extending vertically of the tap so as to discharge lubricant against and below nuts being threaded thereon.

8. A nut threading machine including an upwardly extending chuck open at both ends and having longitudinally extending surfaces for slidably engaging and rotating the nuts, means for rotating said chuck, a tap non-rotatably supported in said chuck through a curved shank extending upwardly beyond the exit end of said nut-rotating surfaces of the chuck, a pusher and actuating means for pushing nuts against the lower and entrance end of said nut-rotating surfaces and into non-slip screwing engagement with the threads of the tap; and, above the exit end of said nut-rotating surfaces, an upwardly directed cam surface circumferentially less than a semi-circle and of a height less than the thickness of a nut engaging and relatively rotating with respect to threaded nuts on said shank to lift the nuts.

9. A nut threading machine including an upwardly extending chuck open at both ends and having longitudinally extending surfaces for slidably engaging and rotating the nuts, means for rotating said chuck, a tap non-rotatably supported in said chuck through a curved shank extending upwardly beyond the upper exit end of said nut-rotating surfaces of the chuck, a pusher and actuating means for pushing nuts against the lower entrance end of said nut-rotating surfaces and into non-slip engagement with the threads of the tap; said nut-rotating surfaces terminating in a radial enlargement of the chuck permitting relative rotation and lag of the threaded nuts with respect to the chuck, and, at the level of said radial enlargement, similar forwardly-directed cam surfaces in which the respective nut-rotating surfaces terminate.

10. A nut threading machine, including in combination, an upwardly extending rotary chuck having surfaces for engaging and rotating nuts sliding therethrough, a tap with a long shank having a straight portion positioned in the axis of the chuck by nuts that are being rotated by said chuck, and a curved portion extending upward and laterally away from the axis of the chuck in a curve of large radius, and thereabove an approximately horizontal portion; together with a stationary guideway affording nut guiding surfaces approximately parallel with curved and horizontal portions of said shank, whereby said stationary guiding surfaces floatingly center and support said shank through a train of previously threaded nuts that are forced along the shank, thereby suspending and preventing axial rotation of the tap in the chuck; and a nut pusher for pushing a nut into the lower end of said chuck and means for reciprocating said pusher in alignment with the chuck; such reciprocating means including a lever extending transversely of the path of said nut pusher, said lever being secured at one end to swing about a fixed axis and having at an intermediate point a pivotal connection with the nut pusher, a long tension spring connected at its lower end to said lever at the end thereof remote from said fixed axis and adapted to actuate the pusher toward the tap, means for adjusting the tension of said spring, and a cam cooperating with said lever between the spring and the nut pusher, said cam being adapted to positively retract the pusher to permit the introduction of a nut above the pusher and to control the upward movement of the pusher when the lever is held by the spring in cooperative relation with the cam.

11. A nut threading machine, including in combination, an upwardly extending rotary chuck having surfaces for engaging and rotating nuts sliding therethrough, a tap with a long shank having a straight portion positioned in the axis of the chuck by the nuts which are being rotated by said chuck, a curved portion extending upward and laterally away from the axis of the chuck in a curve of large radius, and thereabove a portion curving circularly and reversely to an approximately horizontal portion which crosses the axial line of the chuck; together with a stationary guideway affording nut guiding surfaces approximately parallel with reversely curving and horizontal portions of said shank, whereby said stationary guiding surfaces center and floatingly support a train of previously threaded nuts that are forced along the shank, thereby to suspend said shank and tap and prevent axial rotation of the tap in the chuck; and the radial distance of the free end of the shank from said axial line being relatively short as compared with that of the reversely bent portion, so that as the rotating effect of nuts being threaded on the tap tends to pivot the shank about said axis, the free end of the shank has relatively short horizontal movements in response to the equal-angle, opposite-direction movements of said intermediate reversely curved portion of the shank.

12. A nut threading machine as specified in claim 11, and in which the radial distance of the free end of the shank from the axial line of the chuck is less than one-half that of the intermediate, reversely curved portion.

13. A nut threading machine, including in combination, an upwardly extending rotary chuck having surfaces for engaging and rotating nuts sliding therethrough, a tap with a long shank having a straight portion positioned in the axis of the chuck by nuts that are being rotated by said chuck, and a curved portion extending upward and laterally away from the axis of the chuck in a curve of large radius, and thereabove an approximately horizontal portion; together with a stationary guideway affording nut guiding surfaces approximately parallel with curved and horizontal portions of said shank, whereby said stationary guiding surfaces floatingly center and support said shank through a train of previously threaded nuts that are forced along the shank, thereby suspending and preventing axial rotation of the tap in the chuck; and means for supplying lubricant to said chuck and tap, in combination with a plunger located below the chuck, and a bearing also below the chuck wherein said plunger is reciprocable upward in alignment with the chuck, said plunger having a pusher at its upper end of diameter less than the minimum diameter of the chuck, and having a horizontal end surface for leveling engagement with the lower face of the nut blanks, and said pusher and plunger having a continuous interior passage open at the upper end, extending through and below the plunger bearing, and terminating in a drainage discharge outlet to receive the tap and to afford free downward drainage for lubricant and chips to and through the drainage outlet.

14. A combination as specified by claim 13, and wherein the drainage outlet opens directly downward through the extreme lower end of the plunger.

15. A nut threading machine, including in combination, an upwardly extending rotary chuck having surfaces for engaging and rotating nuts sliding therethrough, a tap with a long shank having a straight portion positioned in the axis of the chuck by nuts that are being rotated by said chuck, and a curved portion extending upward and laterally away from the axis of the chuck in a curve of large radius, and thereabove an approximately horizontal portion; together with a stationary guideway affording nut guiding surfaces approximately parallel with curved and horizontal portions of said shank, whereby said stationary guiding surfaces floatingly center and support said shank through a train of previously threaded nuts that are forced along the shank, thereby suspending and preventing axial rotation of the tap in the chuck; in combination with supplemental lifting means, above the tap, symmetrically disposed with respect to an upwardly extending portion of the shank, and arranged to automatically engage each successive threaded nut at a plurality of points equidistant from its axis and push it upward on the shank, thereby lifting said train of threaded nuts independently of the nuts which are being screwed upward on the cutting threads of the tap.

16. A nut threading machine including an upwardly extending rotary chuck and a tap having a long shank positioned in the axis of the chuck by nuts that are being threaded on the tap and floatingly suspended and prevented from axial rotation by a train of threaded nuts sliding along a reversely curving portion of the shank in a similarly curving stationary guideway, such stationary guideway consisting of a casing divided substantially along a plane of the curving guideway, one half being fixed to a suitable support and the other half secured in registry therewith by quick detachable securing means.

17. Apparatus as specified in claim 16, and wherein the securing means includes a sliding clamping plate having keyhole engagement with exteriorly projecting ends of studs on the fixed plate.

18. A nut threading machine including a frame carrying means for supplying and vertically feeding blanks; upper support means carrying a rotary chuck and chuck gearing and having passages for supplying lubricant through the walls of the rotating chuck; a tap supported in the chuck by a long reversely curved shank; and said upper support means carrying above said chuck carrier, a stationary guideway for guiding nuts on the reverse bend portion of said shank, said chuck carrying, and guideway-carrying, upper support being mounted for pivotal movement to and from operating position, about a horizontal axis, and means for rigidly securing said support in the operative position, and means including a conduit swivel jointed coaxially with said pivot and connected to said lubricant supplying passages.

19. A nut threading machine including a frame carrying means for supplying and vertically feeding blanks; upper support means carrying a rotary chuck and chuck gearing; a tap supported in the chuck by a long reversely curved shank; and said upper support means carrying above said chuck carrier, a stationary guideway for guiding nuts on the reverse bend portion of said shank, said chuck carrying, and guideway-carrying, upper support being mounted for pivotal movement to and from operating position, about a horizontal axis, and means for rigidly securing said support in the operative position, and means including parallel upwardly projecting ribs extending along said upper support, corresponding V-shaped grooves in the bottom of said upper support, and means for clamping said upper support to force said grooves downwardly into wedging engagement with said ribs.

JOHN J. McLAUGHLIN.